United States Patent
Tringale et al.

(10) Patent No.: US 9,910,753 B1
(45) Date of Patent: Mar. 6, 2018

(54) SWITCHLESS FABRIC BASED ATOMICS VIA PARTIAL-PROXY

(71) Applicant: EMC Corporation, Hopkinton, MA (US)

(72) Inventors: Alesia Tringale, Worcester, MA (US); Steven T. McClure, Northborough, MA (US); Jerome Cartmell, Natick, MA (US); Julie Zhivich, Westborough, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 102 days.

(21) Appl. No.: 14/974,286

(22) Filed: Dec. 18, 2015

(51) Int. Cl.
*G06F 11/00* (2006.01)
*G06F 11/30* (2006.01)
*G06F 11/22* (2006.01)
*G06F 3/06* (2006.01)
*G06F 13/28* (2006.01)

(52) U.S. Cl.
CPC ........ *G06F 11/3006* (2013.01); *G06F 3/0619* (2013.01); *G06F 3/0665* (2013.01); *G06F 3/0689* (2013.01); *G06F 11/221* (2013.01); *G06F 11/3027* (2013.01); *G06F 11/3034* (2013.01); *G06F 13/28* (2013.01)

(58) Field of Classification Search
CPC ............. G06F 11/3006; G06F 11/3034; G06F 11/2017; G06F 11/2089; G06F 3/0619
See application file for complete search history.

(56) References Cited

U.S. PATENT DOCUMENTS

| | | | | |
|---|---|---|---|---|
| 6,256,748 B1 * | 7/2001 | Pinson | ................ | G06F 11/2007 714/6.23 |
| 7,594,083 B2 * | 9/2009 | Kurokawa | ............ | G06F 3/0607 711/111 |
| 7,917,668 B2 * | 3/2011 | Hosoya | ................... | G06F 3/061 710/22 |
| 9,575,855 B2 * | 2/2017 | Maeda | ..................... | G06F 13/00 |
| 2006/0259712 A1 * | 11/2006 | Onabe | ..................... | G06F 3/061 711/154 |
| 2007/0180293 A1 * | 8/2007 | Takahashi | ........... | G06F 11/0727 714/6.12 |
| 2016/0196078 A1 * | 7/2016 | Preston | ............... | G06F 13/4022 711/114 |

* cited by examiner

*Primary Examiner* — Philip Guyton
(74) *Attorney, Agent, or Firm* — Anderson Gorecki LLP (57) ABSTRACT

A data storage system has first and second computing nodes that are interconnected by a switchless fabric. Each storage node includes first and second paired storage directors with an interconnecting communication link. Atomic operations sent between the computing nodes are mediated by network adapters. Atomic operations sent between paired storage directors via the interconnecting communication link are provided to a network adapter via an internal port and mediated by network adapter. The interconnecting communication links can be used as a backup path for atomic operations in the event of a link failure of the switchless fabric.

20 Claims, 6 Drawing Sheets

SWITCHLESS FABRIC BASED ATOMICS VIA PARTIAL-PROXY

BACKGROUND

Aspects of this disclosure are generally related to data storage systems that can be used to maintain relatively large data sets and support a relatively large number of concurrent users. The basic building blocks of the data storage systems may include storage engines or storage servers. A plurality of storage engines or storage servers can be interconnected in order to function together as a storage array or storage server cluster. Each storage array or storage server cluster typically includes multiple physical storage devices that are used to present logical storage devices to instances of applications running on host devices.

SUMMARY

All examples, aspects and features mentioned in this document can be combined in any technically possible way.

In accordance with an aspect, an apparatus comprises: a data storage system comprising: a plurality of data storage devices; a first computing node comprising paired first and second storage directors and a communications link between the paired first and second storage directors, each of the paired first and second storage directors comprising a processor, a memory, an interface to at least some of the data storage devices, and a network adapter that mediates atomic operations; a second computing node comprising paired third and fourth storage directors and a communications link between the paired third and fourth storage directors, each of the paired third and fourth storage directors comprising a processor, a memory, an interface to at least some of the data storage devices, and a network adapter that mediates atomic operations; and a switchless fabric that interconnects the first computing node with the second computing node via the network adapters; wherein an atomic operation provided by the first storage director is sent as a message to the second storage director via the communications link between the paired first and second storage directors and mediated by the network adapter of the second storage director. In some implementations the switchless fabric comprises multiple point-to-point links between physical ports of the network adapters of the storage directors. In some implementations the atomic operation is used to perform direct memory access between the paired first and second storage directors. In some implementations the network adapters of the first computing node are directly connected to the network adapters of the second computing node. In some implementations each network adapter performs mediation by serializing atomic operations and implementing locks on the memory of the storage director with which the respective network adapter is associated. In some implementations the atomic operation is an atomic read and the network adapter of the second storage director obtains data at a location of the memory of the second storage director indicated by the atomic read. In some implementations the atomic operation is an atomic write and the network adapter of the second storage director establishes a lock at a location of the memory of the second storage director indicated by the atomic write, writes data to the location, and returns an acknowledgement to the first storage director. In some implementations provision of the atomic operation by the first storage director to the second storage director is in response to detection of a failed link of the switchless fabric. In some implementations the atomic operation is initiated by the third storage director and provided by the third storage director to the first storage director via the switchless fabric. In some implementations when a link of the switchless fabric between the third storage director and the second storage director is failed, provision of the atomic operation by the third storage director to the first storage director via the switchless fabric is in response to detection of the failed link.

In accordance with an aspect a method comprises: in a data storage system comprising: a plurality of data storage devices; a first computing node comprising paired first and second storage directors and a communications link between the paired first and second storage directors, each of the paired first and second storage directors comprising a processor, a memory, an interface to at least some of the data storage devices, and a network adapter; a second computing node comprising paired third and fourth storage directors and a communications link between the paired third and fourth storage directors, each of the paired third and fourth storage directors comprising a processor, a memory, an interface to at least some of the data storage devices, and a network adapter; and a switchless fabric that interconnects the first computing node with the second computing node via the network adapters: providing an atomic operation by the first storage director as a message to the second storage director via the communications link between the paired first and second storage directors; and mediating the atomic operation with the network adapter of the second storage director. In some implementations the switchless fabric comprises multiple point-to-point links between physical ports of the network adapters of the storage directors, and the method comprises sending atomic operations via the point-to-point links. In some implementations the method comprises using the atomic operation to perform direct memory access between the paired first and second storage directors. In some implementations the network adapters of the first computing node are directly connected to the network adapters of the second computing node and the method comprises sending atomic operations between a network adapter of the first computing node and a network adapter of the second computing node. In some implementations the method comprises each network adapter performing mediation by serializing atomic operations and implementing locks on the memory of the storage director with which the respective network adapter is associated. In some implementations wherein the atomic operation is an atomic read the method comprises the network adapter of the second storage director obtaining data at a location of the memory of the second storage director indicated by the atomic read. In some implementations wherein the atomic operation is an atomic write the method comprises the network adapter of the second storage director establishing a lock at a location of the memory of the second storage director indicated by the atomic write, writing data to the location, and returning an acknowledgement to the first storage director. In some implementations the method comprises providing the atomic operation by the first storage director to the second storage director in response to detection of a failed link of the switchless fabric. In some implementations the method comprises initiating the atomic operation by the third storage director and providing the atomic operation by the third storage director to the first storage director via the switchless fabric. In some implementations a link of the switchless fabric between the third storage director and the second storage director is failed, and the method comprises providing the atomic operation by the third storage director to the first storage director via the switchless fabric is in response to detection of the failed link.

DETAILED DESCRIPTION

Figure 1:
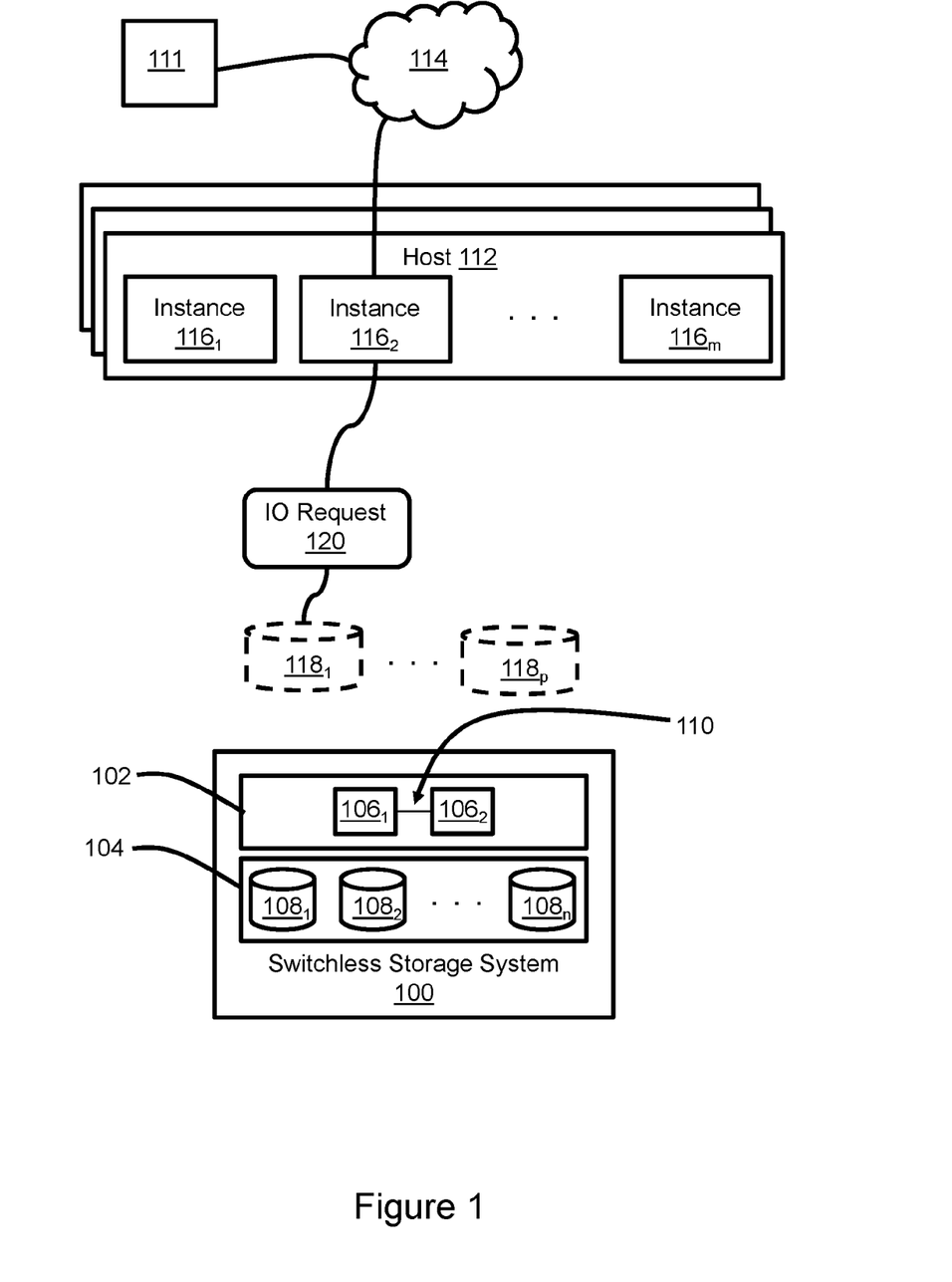
FIG. 1 illustrates a switchless data storage system in use in a network environment.

FIG. 1 illustrates a switchless data storage system 100 that may be used to maintain data and support IOs associated with a large number of concurrent users. The data storage system includes a computing cluster 102 and at least one storage resource pool 104. In the illustrated example the cluster 102 includes two computing nodes $106_1$-$106_2$ and the storage resource pool 104 includes data storage devices $108_1$-$108_n$. The computing nodes and data storage devices are tangible components that provide processing and non-transitory data storage, respectively. The computing nodes $106_1$-$106_n$ could include storage engines, storage servers, or any of a wide variety of other devices, for example and without limitation. The storage devices $108_1$-$108_n$ may include pools of different types of storage devices that are organized into hierarchical tiers. For example and without limitation, the storage devices may include flash drives at tier 0, FC (Fibre Channel) drives at tier 1, and SATA (serial advanced technology attachment) drives at tier 2. The different computing nodes $106_1$, $106_2$ are interconnected via a switchless network fabric 110 that may be based on Infiniband, PCI-X, Fibre Channel, Gigabit Ethernet, or any other of a wide variety of non-proprietary or proprietary technologies, for example and without limitation.

An exemplary computing device 111 such as a user terminal or server uses the data storage system 100 by communicating with a host device 112 via a network 114, e.g. the Internet or some other network. Many computing devices may utilize the data storage system concurrently. However, only one computing device 111 is shown for simplicity of illustration and explanation. Multiple host devices 112 may be associated with the storage system 100, and each host device may host any of a wide variety of applications. An exemplary host device may be a type of server which hosts one or more instances $116_{1-m}$ of an application such as a database, for example and without limitation, for which the corresponding data is maintained by the data storage system 100. The data storage system 100 may create logical storage devices $118_1$-$118_p$ for presentation to the host device, although a system admin might create the logical storage devices for any of a variety of purposes. The logical storage devices, which may be referred to as or by LUNs (logical unit numbers) or meta-volumes, may be presented to the host as a set of contiguous address locations. The application and the host device will typically be unaware of the actual location of data on the physical storage devices. A communication between the computing device 110 and an instance of an application running on the host 112 may prompt data access, and a corresponding IO request 120 sent to the storage system 100 by the application instance $116_2$ in order to read or write data will reference a location in a particular logical storage device, e.g., logical storage device $118_1$. The computing nodes $106_1$-$106_2$ maintain a mapping between the logical storage devices $118_1$-$118_p$ and the physical storage devices $108_1$-$108_n$ so that data access can be implemented based on references to locations in logical storage devices. The data stored on each logical storage device may be distributed across multiple physical storage devices, and extents of data may be moved between physical storage devices in response to tiering decisions and other factors. Any of the computing nodes $106_1$-$106_2$ can receive and process the IO request 120, e.g., by writing data to the physical storage devices or reading data from the physical storage devices and sending the data to the host. Consequently, the computing nodes share loading, and the failure of a computing node does not prevent a host device from accessing the storage system.

Figure 2:
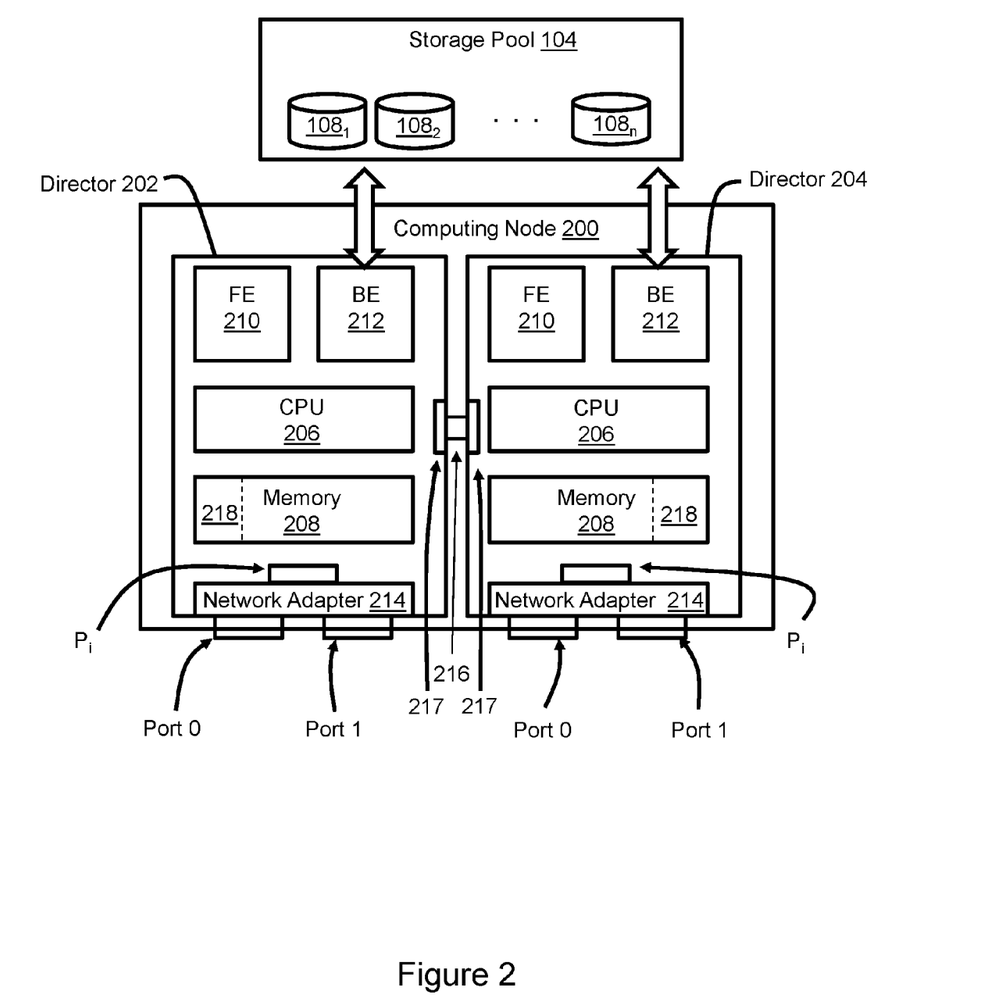
FIG. 2 illustrates an implementation of one of the computing nodes of the switchless data storage system of FIG. 1 in greater detail.

FIG. 2 illustrates a computing node 200 which is an exemplary implementation of computing nodes $106_1$, $106_2$ (FIG. 1). The computing node 200 includes paired storage directors 202, 204. Each storage director includes a multi-core CPU 206, a volatile memory cache 208, a FE (front end) module 210, and BE (back end) module 212, and a switchless network adapter 214 such as a CA (channel adapter), all or part of which may be implemented on a single printed circuit board blade, although that should not be viewed as limiting. The front end module 210 is configured to interface with the host devices 106 (FIG. 1). For example, the front end module presents the logical storage devices, receives IO requests from host application instances, and provides data in response to read requests. The back end module 212 interfaces with storage pool 104 which contains the back end physical storage devices $108_1$-$108_n$. For example, the back end module reads data from and writes data to the back end storage devices. The CPU 206 runs a variety of programs configured to cause the director to perform IOs and other functions. The memory 208 may include volatile memory components such as RAM (random access memory) chips for example and without limitation. The network adapter 214 includes two physical ports, Port 0 and Port 1, and an internal port, Port i. The storage directors 202, 204 are interconnected via a switchless link 216 and interfaces 217 that may be based on Infiniband, PCI-X, Fibre Channel, Gigabit Ethernet, and various proprietary technologies, for example and without limitation.

The memory 208 of each storage director includes a cache slots section 218 which is allocated for temporarily storing data that is being written to or read from the back end storage devices. For example, data that is being written by a host device is initially copied to the cache slots and subsequently destaged to the back end storage devices. Data that is being read by a host device is copied from the back end storage devices to the cache slots and then provided to the host via the back-end module. Data may also be copied to the cache slots from the back end storage devices in response to a hint. When data corresponding to an IO request is already in the cache slots, i.e., a "cache hit," then that cached copy of the data can be used to service the IO request without accessing back end storage. When the data being accessed is not already in the cache slots, i.e. a "cache miss," then that data is copied into the cache in order to service the IO request, e.g., copied into cache slots from back end storage in response to a read request. Generally, any data that has not been accessed recently or within a predetermined period of time may be flushed from the cache slots and written to the back end storage devices. The storage directors 202, 204 may operate in parallel such that IO requests are concurrently serviced and the failure of one director does not cause the failure of other directors.

Referring to FIGS. 1 and 2, the cache slots section 218 of the memory 208 of each director 202, 204 is shared globally within the data storage system 100. More particularly, any director in the data storage system can write to and read from the cache slots of the other directors in the data storage system, e.g. and without limitation via DMA (direct memory access). Consequently, if a director associated with computing node $106_1$ receives a request to access data that is in the cache slots of a director associated with computing node $106_2$ it is considered as a cache hit. The director associated with computing node $106_1$ accesses the data from the cache slots of the director associated with computing node $106_2$ via fabric 110 and, for example, provides the data to the host via the front end module or writes to the cache of the director associated with storage node $106_2$. As will be explained in greater detail below, access to cache slots between paired storage directors 202, 204 associated with the same computing node 200 is supported by link 216.

Figure 3:
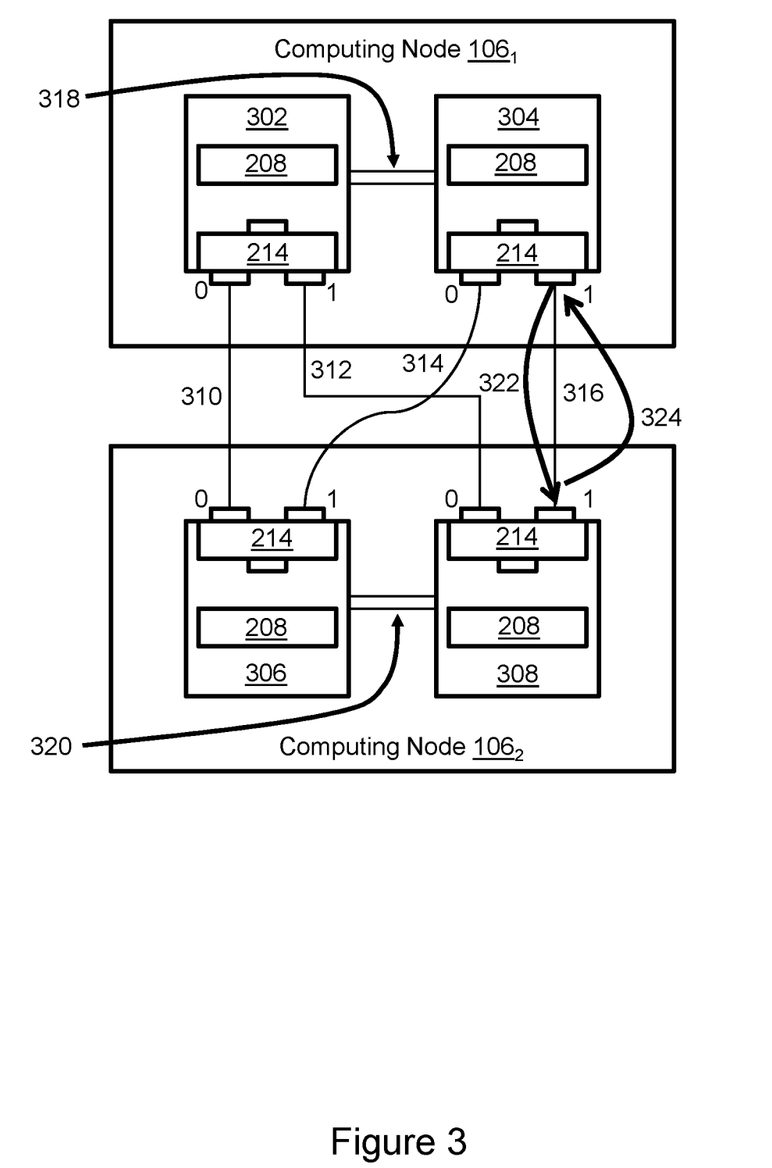
FIG. 3 illustrates interconnection of computing nodes via a switchless fabric.

Referring to FIG. 3, the switchless fabric 110 (FIG. 1) may include point-to-point links that provide high speed communications to support operations such as RDMA (Remote Direct Memory Access). In the illustrated example the switchless fabric includes point-to-point links between physical ports of storage directors 302, 304, 306 and 308. For example, link 310 connects port 0 of director 302 with port 0 of director 306, link 312 connects port 1 of director 302 with port 0 of director 308, link 314 connects port 0 of director 304 with port 1 of director 306, and link 316 connects port 1 of director 304 with port 1 of director 308. The network adapters are endpoints of the point-to-point links, and the links may be implemented by direct connections between printed circuit boards or components, e.g. and without limitation without cabling. Independent of the switchless fabric, link 318 connects director 302 with its pair director 304, and link 320 connects director 306 with its pair director 308. Links 318, 320 may also be switchless and be implemented by direct connections between printed circuit boards or components, e.g. and without limitation without cabling. However, interfaces 217 (FIG. 2) are endpoints for links 318, 320 between paired storage directors.

Atomic operations are used to perform direct memory access between different storage directors. An atomic operation acting on shared memory 208 in any storage director completes in a single step relative to other threads, and thus appears to occur instantaneously to those other threads and cannot be observed in a partially completed state by those other threads. Atomicity provides isolation from concurrent processes. Examples of atomic operations may include but are not necessarily limited to atomic read, write, and RMW (read-modify-write) operations. An atomic RMW reads from a location in shared memory and simultaneously writes a different value in its place. Because the system is switchless, the atomic operations are mediated by endpoints. For example, the network adapters 214, which may include components such as channel adapters or NICs (network interface cards) associated therewith, function as source and target endpoints for atomic operations sent via the switchless fabric. The network adapters perform mediation by serializing atomic operations and implementing locks on the shared memory of the storage director with which they are associated, for example and without limitation. More particularly, a target channel adapter functions as a target endpoint which performs mediation for atomic operations for source endpoints directly connected thereto. In the illustrated example an atomic operation 322 is initiated by storage director 304 in order to access shared memory 208 of storage director 308. The network adapter of storage director 304, acting as a source endpoint, sends the atomic operation instructions to the network adapter of storage director 308, which acts as a target endpoint. In the case of an atomic read, the data at a location of shared memory indicated in the instructions is returned to storage director 304 in communication 324. In the case of an atomic write, the network adapter of storage director 308 establishes locks in local shared memory 208, writes the data to the local shared memory, returns an acknowledgement to storage director 304 in communication 324, and releases the locks.

Figure 4:
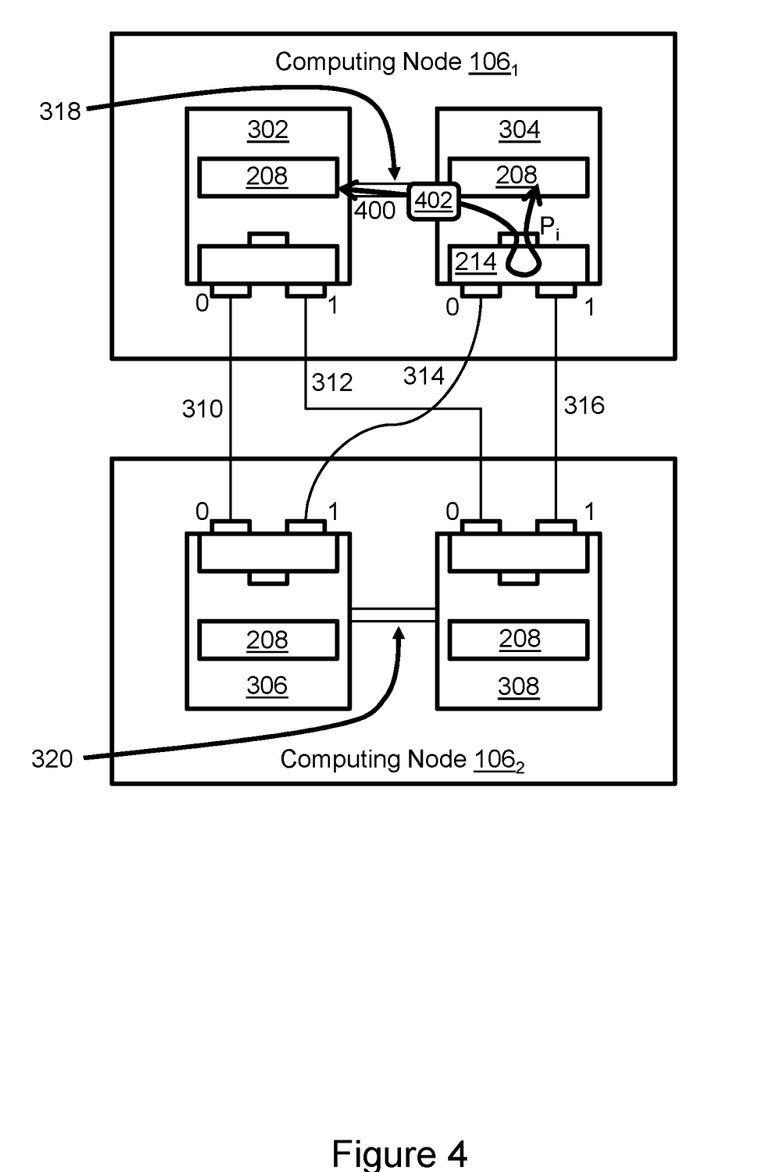
FIG. 4 illustrates an atomic operation between paired storage directors of the computing node without traversing the switchless fabric.

Referring to FIG. 4, because the network adapters 214 are used as mediating endpoints for atomic operations, an atomic operation between corresponding paired storage directors 302, 304 via link 318, or paired storage directors 306, 308 via link 320, is implemented by partial-proxy. In the illustrated example an atomic operation 400 is initiated by storage director 302 via link 318 in order to access shared memory 208 of storage director 304. The atomic operation 400 is sent as a message 402 from storage director 302 to storage director 304 via link 318. Storage director 304 receives the message and directs the atomic operation 400 to network adapter 214 via the internal port $P_i$. The network adapter of storage director 304, acting as a partial proxy target endpoint, implements the atomic operation in the manner of a loopback through internal port $P_i$. In the case of an atomic read, the network adapter 214 of storage director 304 obtains the data from the location of shared memory indicated in the instructions and returns that data to storage director 302 via link 318. In the case of an atomic write, the network adapter 214 of storage director 304 establishes locks in local shared memory 208, writes the data to the local shared memory, returns an acknowledgement to storage director 302 via link 318, and releases the locks.

Figure 5:
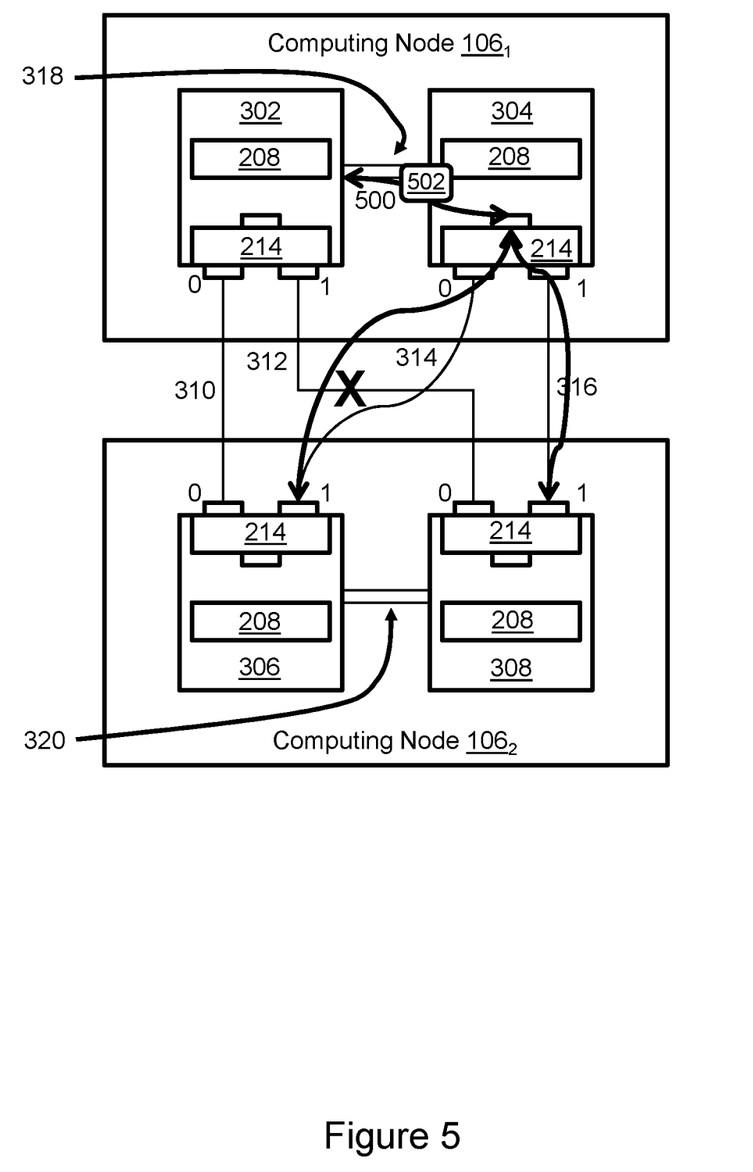
FIGS. 5 and 6 illustrate use of interconnecting communication links between paired storage directors as a backup path for atomic operations in the event of a link failure of the switchless fabric.

Referring to FIG. 5, the technique described above can be adapted to for use in responding to a link failure of the switchless fabric. In the illustrated example link 312 is failed. In order for storage director 302 to access shared memory 208 of storage director 308 and storage director 306 an atomic operation 500 is sent as a message 502 from storage director 302 to storage director 304 via link 318. Storage director 304 receives the message 500 and directs the atomic operation 500 to channel adapter 214 via the internal port $P_i$. The message 502 indicates the network adapters of storage director 306 and storage director 308 as target endpoints. The network adapter of storage director 304, acting as a partial-proxy for the network adapter of storage director 302, implements the atomic operation by communicating the instructions to the target network adapters of storage directors 306, 308 via link 314 and link 316. The target network adapters respond by implementing the atomic operation. In the case of an atomic read, the data at locations of shared memory indicated in the instructions is obtained by the network adapters of storage director 306 and storage director 308 and returned to storage director 304 via link 314 and link 316. Storage director 304 returns the data to storage director 302 via link 318. In the case of an atomic write, the network adapters of storage director 306 and storage director 308 establish locks in local shared memory 208, write the data to the local shared memory, return acknowledgements to storage director 304 via link 314 and link 316, and release the locks. The acknowledgements are forwarded from director 304 to director 302 via link 318. Thus, the atomic operations are implemented in the presence of a link failure of the switchless fabric.

Figure 6:
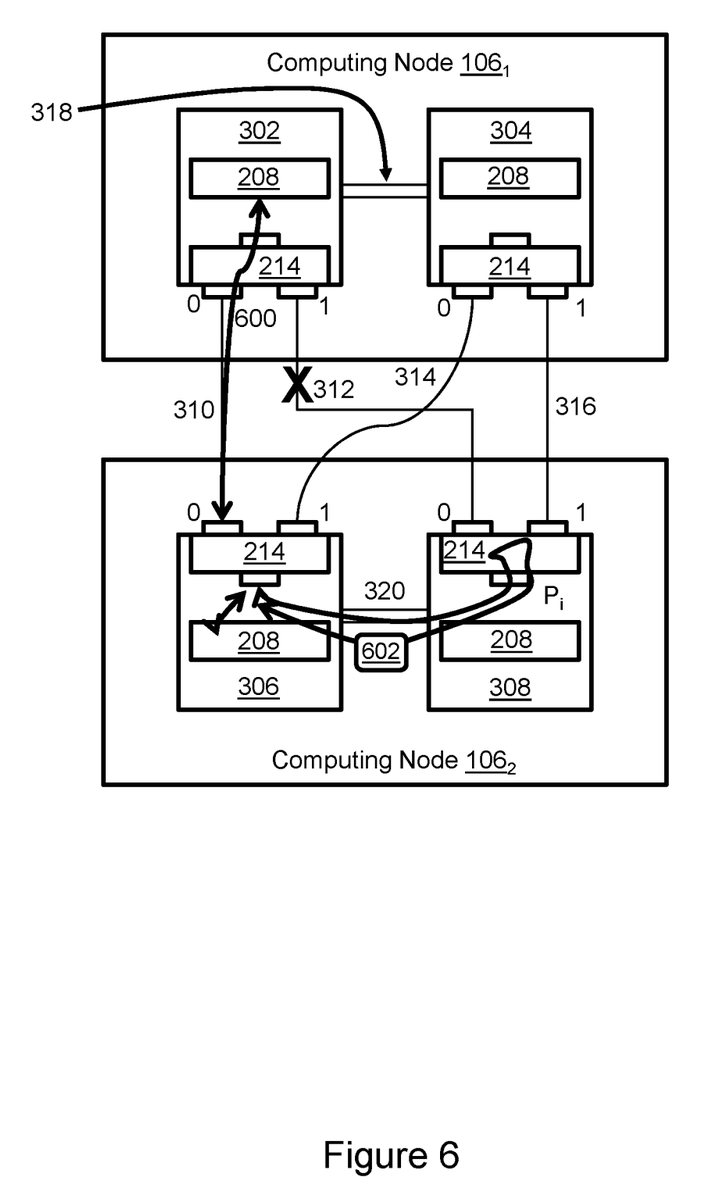

FIG. 6 illustrates variant atomic operations between directors of different computing nodes in the presence of the link failure described above, i.e., link 312 is failed. In order for storage director 302 to access shared memory 208 of storage director 308 and storage director 306 an atomic operation 600 is sent from storage director 302 to storage director 306 via link 310. The network adapter of storage node 306, acting as a target endpoint, accesses the shared memory 208 of storage director 306. In the case of an atomic read, the data at locations of shared memory indicated in the instructions is obtained by the network adapter of storage director 306 and returned to storage director 302 via link 310. In the case of an atomic write, the network adapter of storage director 306 establishes locks in local shared memory 208, writes the data to the local shared memory, returns an acknowledgement to storage director 302 via link 310, and releases the locks. Further, storage director 306 forwards the atomic operation to storage director 308 as a message 602 via link 320. Storage director 308 receives the message and directs the atomic operation to local network adapter 214 via the internal port $P_i$. The network adapter of storage director 304, acting as a target endpoint, implements the atomic operation in the manner of a loopback through internal port $P_i$. In the case of an atomic read, the data at a location of shared memory indicated in the instructions is obtained by the network adapter of storage director 308 and returned to storage director 306 via link 320, and then forwarded to storage director 302 via link 310. In the case of an atomic write, the network adapter of storage director 308 establishes locks in local shared memory 208, writes the data to the local shared memory, returns an acknowledgement to storage director 306 via link 320, and releases the locks. The acknowledgement is forwarded from storage director 306 to storage director 302 via link 310. Thus, multiple techniques can be used in response to the failure of link 312 to maintain availability of storage directors.

Another path allows storage director 302 to write a mirrored RDMA to both storage director 306 and storage director 308 when link 312 is down. For example, storage director 302 can RDMA the write data to the global memory cache 208 of storage director 306 and then send a message to storage director 306 indicating that there is write data that the director needs to push across CMI link 320 to the global cache 208 of storage director 308. Once the RDMA write data is moved to storage director 308 successfully, storage director 306 sends a message back to storage director 302 to indicate that the RDMA write to storage director 308 was successful.

Those of ordinary skill in the art will recognize that a wide variety of variants are possible. For example, different sets of links could be utilized to perform atomic operations in the presence of a link failure. Moreover, more than one link may fail. Such variants are within the scope of this disclosure.

Some aspects, features and implementations may comprise computer components and computer-implemented steps or processes that will be apparent to those skilled in the art. For example, it should be understood by one of skill in the art that the computer-implemented steps or processes may be stored as computer-executable instructions on a non-transitory computer-readable medium. Furthermore, it should be understood by one of skill in the art that the computer-executable instructions may be executed on a variety of physical processor devices. For ease of exposition, not every step or element is described herein as part of a computer system, but those skilled in the art will recognize steps and elements that may have a corresponding computer system or software component. Such computer system and software components are therefore enabled by describing their corresponding steps or elements, and are within the scope of the disclosure.

A number of features, aspects, embodiments and implementations have been described. Nevertheless, it will be understood that a wide variety of modifications and combinations may be made without departing from the scope of the inventive concepts described herein. Accordingly, those modifications and combinations are within the scope of the following claims.

What is claimed is:

1. An apparatus comprising:
   a data storage system comprising:
      a plurality of data storage devices;
      a first computing node comprising paired first and second storage directors and a communications link between the paired first and second storage directors, each of the paired first and second storage directors comprising a processor, a memory, an interface to at least some of the data storage devices, and a network adapter that mediates atomic operations;
      a second computing node comprising paired third and fourth storage directors and a communications link between the paired third and fourth storage directors, each of the paired third and fourth storage directors comprising a processor, a memory, an interface to at least some of the data storage devices, and a network adapter that mediates atomic operations; and
      a switchless fabric that interconnects the first computing node with the second computing node via the network adapters;
      wherein an atomic operation provided by the first storage director is sent as a message to the second storage director via the communications link between the paired first and second storage directors and mediated by the network adapter of the second storage director.

2. The apparatus of claim 1 wherein the switchless fabric comprises multiple point-to-point links between physical ports of the network adapters of the storage directors.

3. The apparatus of claim 1 wherein the atomic operation is used to perform direct memory access between the paired first and second storage directors.

4. The apparatus of claim 1 wherein the network adapters of the first computing node are directly connected to the network adapters of the second computing node.

5. The apparatus of claim 1 wherein each network adapter performs mediation by serializing atomic operations and implementing locks on the memory of the storage director with which the respective network adapter is associated.

6. The apparatus of claim 1 wherein the atomic operation is an atomic read and the network adapter of the second storage director obtains data at a location of the memory of the second storage director indicated by the atomic read.

7. The apparatus of claim 1 wherein the atomic operation is an atomic write and the network adapter of the second storage director establishes a lock at a location of the memory of the second storage director indicated by the atomic write, writes data to the location, and returns an acknowledgement to the first storage director.

8. The apparatus of claim 1 wherein provision of the atomic operation by the first storage director to the second storage director is in response to detection of a failed link of the switchless fabric.

9. The apparatus of claim 1 wherein the atomic operation is initiated by the third storage director and provided by the third storage director to the first storage director via the switchless fabric.

10. The apparatus of claim 9 wherein a link of the switchless fabric between the third storage director and the second storage director is failed, and provision of the atomic operation by the third storage director to the first storage director via the switchless fabric is in response to detection of the failed link.

11. A method comprising:
   in a data storage system comprising: a plurality of data storage devices; a first computing node comprising paired first and second storage directors and a communications link between the paired first and second storage directors, each of the paired first and second storage directors comprising a processor, a memory, an interface to at least some of the data storage devices, and a network adapter; a second computing node comprising paired third and fourth storage directors and a communications link between the paired third and fourth storage directors, each of the paired third and fourth storage directors comprising a processor, a memory, an interface to at least some of the data storage devices, and a network adapter; and a switchless fabric that interconnects the first computing node with the second computing node via the network adapters:
   providing an atomic operation by the first storage director as a message to the second storage director via the communications link between the paired first and second storage directors; and
   mediating the atomic operation with the network adapter of the second storage director.

12. The method of claim 11 wherein the switchless fabric comprises multiple point-to-point links between physical ports of the network adapters of the storage directors, and comprising sending atomic operations via the point-to-point links.

13. The method of claim 11 comprising using the atomic operation to perform direct memory access between the paired first and second storage directors.

14. The method of claim 11 wherein the network adapters of the first computing node are directly connected to the network adapters of the second computing node and comprising sending atomic operations between a network adapter of the first computing node and a network adapter of the second computing node.

15. The method of claim 11 comprising each network adapter performing mediation by serializing atomic operations and implementing locks on the memory of the storage director with which the respective network adapter is associated.

16. The method of claim 11 wherein the atomic operation is an atomic read and comprising the network adapter of the second storage director obtaining data at a location of the memory of the second storage director indicated by the atomic read.

17. The method of claim 11 wherein the atomic operation is an atomic write and comprising the network adapter of the second storage director establishing a lock at a location of the memory of the second storage director indicated by the atomic write, writing data to the location, and returning an acknowledgement to the first storage director.

18. The method of claim 11 comprising providing the atomic operation by the first storage director to the second storage director in response to detection of a failed link of the switchless fabric.

19. The method of claim 11 comprising initiating the atomic operation by the third storage director and providing the atomic operation by the third storage director to the first storage director via the switchless fabric.

20. The method of claim 19 wherein a link of the switchless fabric between the third storage director and the second storage director is failed, and comprising providing the atomic operation by the third storage director to the first storage director via the switchless fabric is in response to detection of the failed link.

* * * * *